United States Patent [19]

O'Brien

[11] 4,386,401
[45] May 31, 1983

[54] HIGH SPEED PROCESSING RESTARTING APPARATUS

[75] Inventor: Steven M. O'Brien, Norristown, Pa.

[73] Assignee: Sperry Corporation, New York, N.Y.

[21] Appl. No.: 172,619

[22] Filed: Jul. 28, 1980

[51] Int. Cl.³ .......................... G06F 1/04; G06F 13/00
[52] U.S. Cl. ..................................................... 364/200
[58] Field of Search ... 314/200 MS File, 900 MS File; 364/569; 307/269

[56] References Cited

U.S. PATENT DOCUMENTS

| | | | |
|---|---|---|---|
| 3,753,232 | 8/1973 | Sporer | 364/200 |
| 4,042,911 | 8/1977 | Bourke et al. | 364/200 |
| 4,050,096 | 9/1977 | Bennett et al. | 364/200 |
| 4,153,491 | 5/1979 | Caddell | 364/900 |

*Primary Examiner*—Raulfe B. Zache
*Assistant Examiner*—Eddie P. Chan
*Attorney, Agent, or Firm*—John B. Sowell; Kenneth T. Grace; Marshall M. Truex

[57] ABSTRACT

The present apparatus includes logic for stopping timing circuits in a central processing unit and for restarting the timing circuits to produce timing signals synchronized with an asynchronous external signal. The continuous running master clock of the central processing unit is employed to generate a plurality of phase related new clock signals. Logic circuit means are provided to sequentially attempt to employ each of the new clock signals until one of the new clock signals synchronizes with the external asynchronous signal. The logic circuit means include circuits for selecting a new clock signal to be employed by the timing circuits of the central processing unit so that the new clock is synchronized with the external asynchronous signal.

6 Claims, 8 Drawing Figures

HIGH SPEED PROCESSING RESTARTING APPARATUS

BACKGROUND OF THE INVENTION

1. Field of the Invention

This invention relates to clock systems employed to synchronize or time the operation of high speed central processing units. More particularly, this invention relates to logic circuits for generating a plurality of new clock signals which are phase related to the master clock of the central processing unit and for selecting one of the new clock signals to be employed as the master clock for the central processing unit. The new clock selected to be used in place of the master clock is the first of the new clock signals capable of synchronizing with an incoming asynchronous control signal.

2. Discussion of the Prior Art

It is well known that high speed central processing units have their own clocks and timing circuits for coordinating the transfer of data or instructions in the central processing unit. It is also well known that external peripheral memory devices such as disk drives, tape drives and external memory do not operate at the same high speed as the central processing unit and may require auxiliary timing means for communicating with the central processing unit. When the information in a peripheral device is to be transferred into an active or working register of the central processing unit, it must be read out of some device such as a buffer register with timing circuits of the central processing unit.

In the case of some solid state memories, the request for data or instruction causes the memory to transfer the data or instruction at the identified address location in memory. Such memory systems often preceed the actual information being transferred to the central processing unit with a ready signal or an information is on the bus signal. When such memories are employed, it has been the practice to synchronize the incoming information with the timing circuits of the central processing unit. Heretofore, it has been a desirable practice to automatically store the information from the memory in a buffer register and to generate a signal to the central processing unit that the buffer register is loaded.

High speed central processing units employ relatively large memories in which is stored instructions and data. After each instruction is processed, a new instruction is retrieved from the instruction memory and executed. The instruction from memory is processed into the computer by timing circuits which synchronize the transfer of the instruction into the instruction registers. While the computer is waiting for the next instruction, it ordinarily is capable of performing useful work; however, often there is no work to be processed before the new instruction is received. It has been suggested that buffer registers could be employed to load the next instruction to be performed in a ready or stand-by register where faster access could be obtained. While this expedient overcomes the problem associated with slow access memories, it does not enhance the access time of most solid state internal memories or the time required to transfer the instruction from a buffer register into the instruction registers.

Modern high speed central processing units perform routines which require one or more branching operations. To anticipate the next instruction for such a routine would require substantial duplication of the memory in the form of buffer instruction registers as well as logic circuitry for enabling the selection of the proper buffer instruction register.

While this problem has been explained with reference to instructions to be executed, the same problem exists when data words are transferred from memory into a working or active register of the central processing unit.

Once the desired information is located in memory, some signals such as an instruction ready or data is on the bus signal is generated which indicates that the instruction or data is capable of being transferred or is actually being transferred to a buffer register. Then and only then do the timing circuits of the central processing unit begin to synchronize the transfer of the instruction or data into active working registers of the central processing unit. Thus, in the prior art central processing units, the master clock times the transfer of information into and out of the buffer registers. It has been the practice to synchronize the asynchronous incoming signals with the synchronous master clock of the central processing unit by employing the aforementioned buffer registers.

In a typical high speed central processing unit, every instruction to be executed must be retrieved from memory. While not every instruction requires additional data from memory, on average the instructions will require at least one data word from memory. Accordingly, any decrease in the time for transferring information from an external asynchronous memory into the working registers of a central processing unit will directly increase the throughput of the central processing unit.

SUMMARY OF THE INVENTION

It is a primary object of the present invention to provide logic circuits for restarting a central processing unit machine cycle as soon as possible after receipt of a predetermined ready signal from an external memory source.

It is another primary object of the present invention to provide novel logic circuits which include a plurality of clocks separated in phase or time from the master clock.

It is a further object of the present invention to provide novel circuits for sensing a stabilized ready signal and for selecting one of a plurality of phase related clocks to initiate a machine cycle.

It is a further object of the present invention to provide novel logic timing and selection circuits for restarting a central processing unit after a ready signal is sensed so as to synchronize the timing circuits with the incoming asynchronous ready signal.

It is the general object of the present invention to provide novel logic circuits for interrupting the normal machine cycle of the central processing unit and for restarting the central processing unit with a new machine cycle as soon as possible after sensing an asynchronous signal indicating that the central processing unit may be restarted.

These and other objects of the present invention are provided in logic circuitry having means for sensing a ready signal and means for generating a plurality of clock signals which are out of phase with the master clock signal. The means for sensing the ready signal are coupled to means for generating a plurality of new clock signals to provide a signal for selecting a new clock to be employed by the timing circuits of the central processing unit so that the new clock is synchronized with the external asynchronous signal.

BRIEF DESCRIPTION OF THE DRAWINGS

The foregoing objects and advantages of the novel timing circuits for a central processing unit and its mode of operation will be made apparent from the detailed description of the accompanying drawings in which.

DESCRIPTION OF THE PREFERRED EMBODIMENT

Figure 1:
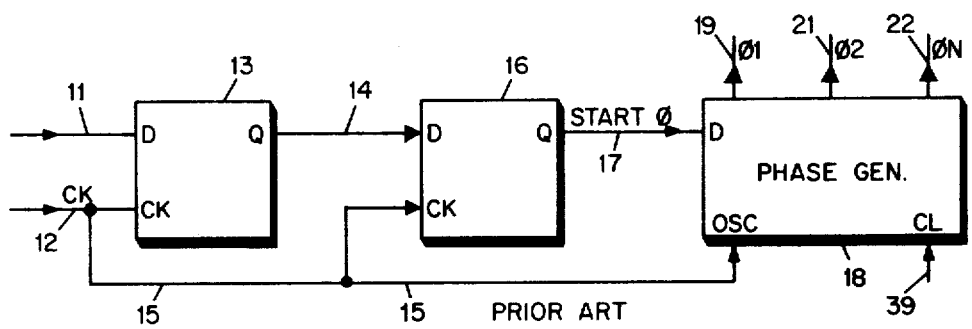
FIG. 1 shows a prior art dual rank flip-flop for demetastabilizing an incoming asynchronous signal.

Refer now to FIG. 1 showing a typical prior art circuit for demetastabilizing a random asynchronous signal. The random asynchronous signal on line 11 may be any type of information or control signal which is attempting to get into the central processing unit (CPU). The master clock (of the CPU not shown) on line 12 clocks the information on line 11 to produce a signal at the Q output of the flip-flop 13 on line 14. The next following clock pulse on line 15 clocks the information on line 14 to produce an output at the Q output of flip-flop 16 on line 17. The output on line 17 produces a data bit input into the phase generator 18 which is shifted through the phase generator 18 by the oscillator clock signal on line 15 to produce sequential outputs on the phase lines phase 1 to phase N shown as lines 19, 21 and 22.

Figure 2:
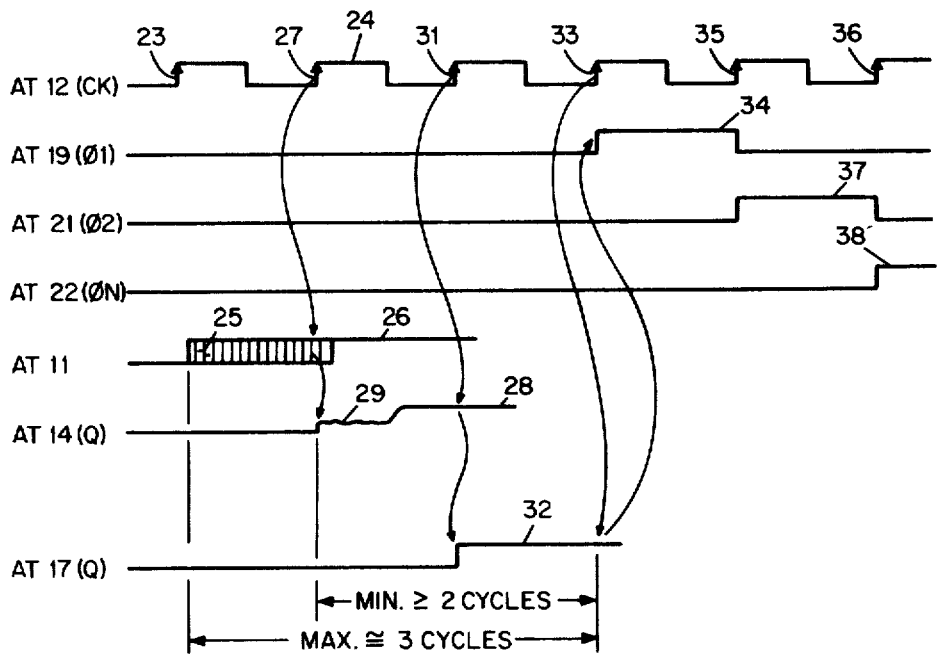
FIG. 2 is a pulse waveform diagram for explaining the operation of FIG. 1.

Referring to FIG. 2, the leading edge 23 of clock signal 24 on line 12 rises premature and was not able to coincide with the information signal on line 11 shown as pulse duration 25 on waveform 26. However, the next following leading edge 27 of clock signal 24 on line 12 coincides with the information signal 25 on line 11, thus attempting to generate an output at the Q output of flip-flop 13. Purposely, the leading edge 27 has been shown barely coinciding with the leading edge of pulse duration information pulse 25 so that it creates a condition that is barely stable and causes the Q output to first rise to a half level and subsequently rise to a full level output. The coincidence of leading edge 27 with information pulse 25 is thus shown to be an unstable condition. Regardless of how long the information pulse 25 is made, the leading edges 23, 27 or any following leading edge can coincide with the leading edge or trailing edge of information pulse 25 thus creating an unstable condition. Accordingly, the information pulse 25 must be made longer than one clock time to assure that a stable condition will occur at one of two sequential clock pulse times. After the leading edge of 27 of waveform 24 has coincided with a portion of the information signal 25 and caused waveform 28 to generate a high output on line 14, there is a stable data input to flip-flop 16 even though the high state was reached by partial instability as shown at point 29. When the leading edge 31 of the next following clock pulse 24 is applied via line 15 to flip-flop 16, a high output is generated at line 17 as shown by waveform 32. The high output on line 17 to phase generator 18 effectively places a one bit in the phase generator and starts the phase generator as the bit is shifted from phase to phase by the clock pulses on line 15 being applied at the oscillator input of the phase generator 18. The data input is high as shown at waveform 32 when the leading edge 33 of the next following clock pulse 24 arrives causing the data bit to be shifted into the phase one position of the phase generator 18 thus generating phase one output on line 19 as shown at waveform 34. In similar manner the leading edges 35 and 36 of waveform 24 generate the phase two and phase N waveforms 37 and 38, respectively. Unless the phase generator is cleared by a pulse on line 39, the phase generator continues to regenerate the cycle of phase outputs on lines 19, 21 and 22.

Having explained that an incoming information signal on line 11 is an asynchronous pulse and may occur during an unstable period, the maximum time for starting the phase generator is approximately three clock periods as shown in FIG. 2 spanning the period between the leading edges 23 and 33. If the asynchronous incoming pulse 25 arrives at a time which immediately coincides with the leading edge of a clock pulse such as that shown at leading edge 27, then the minimum time for starting the phase generator is slightly greater than two clock periods as shown by the time span between leading edges 27 and 33. Since the phase generator of FIGS. 1 and 2 requires two to three clock cycles to initiate the start of phase generator 18, the average time for starting a phase generator of this type is slightly greater than two and one half clock periods.

Figure 3:
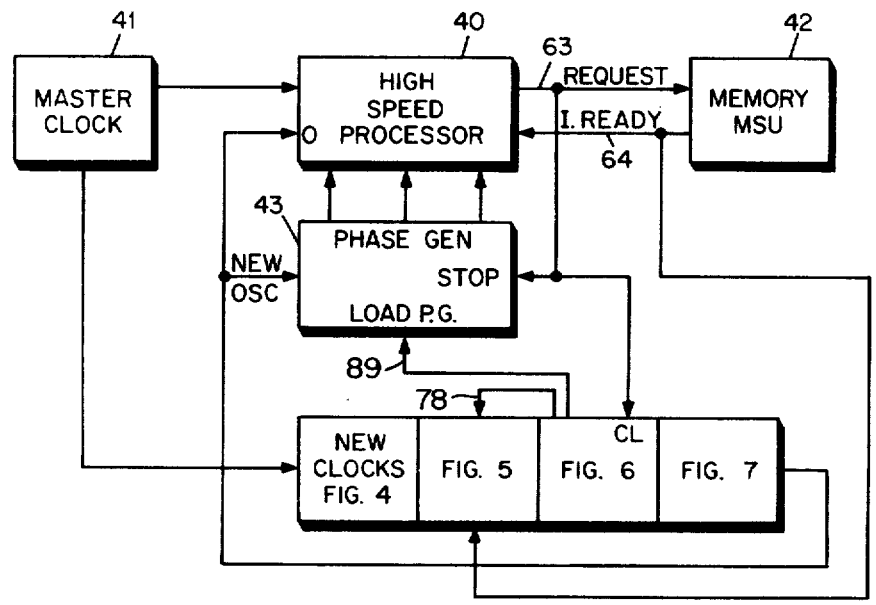
FIG. 3 is a schematic block diagram of the present invention system.

Refer now to FIG. 3 showing a high speed processor 40. High speed processors are designed for medium to large scale processing systems and are generally of the type having separate or external master clocks 41. The main storage unit 42 is physically separated from the processor 40 and clock 41 even though it may be in the same cabinet or on an adjacent board in the processor cabinet. The phase generator 43 for the high speed processor 40 is ordinarily in the same cabinet with the processor and may be on the same board. It will be understood that the present invention employs prior art processors 40, prior art clocks 41, prior art main storage units 42 and phase generators 43. The present invention is embodied in the blocks labeled FIGS. 4 to 7, which will be explained in detail hereinafter. It will also be understood that the state of the art permits some of the circuitry that will be explained in FIGS. 4 to 7 to be made in very large integrated circuit form and combined with other elements 40 to 43.

Figure 4:
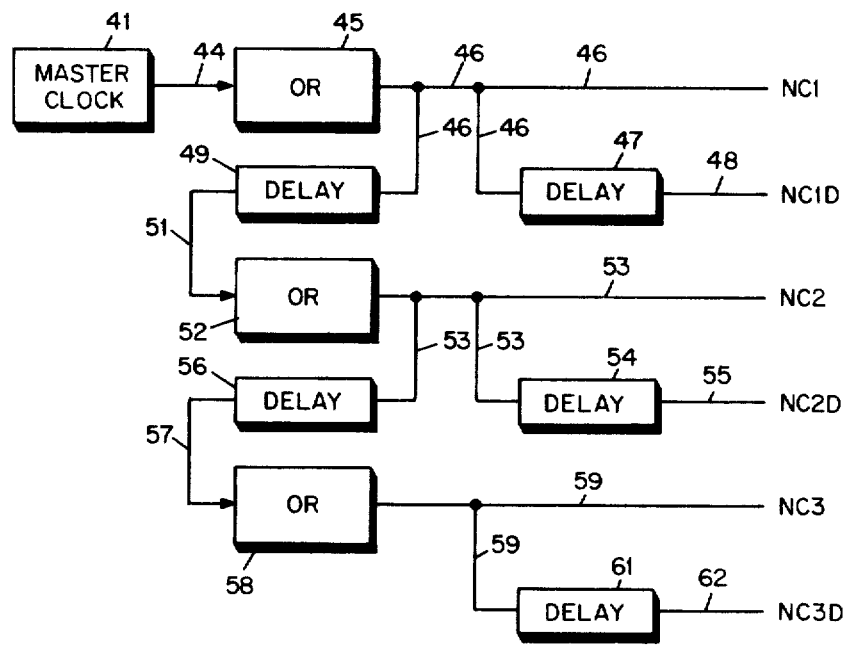
FIG. 4 is a schematic block diagram showing circuits for generating a plurality of phase related new clock signals and delayed new clock signals employing the master clock as reference.

Refer now to FIG. 4 showing the means for generating a plurality of new clock signals which are phase related to the master clock signal. Master clock 41 is producing a uniform square wave pulse output on line 44 which is applied to OR gate 45 to produce an output on line 46, identified as new clock 1 (NC1). The same output on line 46 is applied to delay 47 to produce a delayed new clock one output (NC1D) on line 48. As will be explained hereinafter, the delayed clock will be employed to avoid a metastable condition in the scanning and stabilizing circuits of FIG. 5. The clock output on line 46 is also applied to a delay 49 to produce a delayed output on line 51 which is applied to OR gate 52 to produce a new clock two (NC2) on line 53. It will be apparent that new clock two (NC2) is phase shifted from new clock one by an amount equal to the delay in delay 49 and the logic delay of OR gate 52. The output on line 53 is also applied to delay 54 to produce a new clock two delayed (NC2D) on line 55. The new clock two on line 53 is also applied to delay 56 to produce an output on line 57, which is applied to or gate 58 to produce new clock three (NC3) on line 59. The output on line 59 is applied to delay 61 to produce new clock three delayed (NC3D) on line 62. The purpose of delays 49 and 56 is to phase shift new clock two and new clock three equal amounts from new clock one and each other. For example, if the master clock is producing clock pulses every eighteen nanoseconds, new clock two will be removed from new clock one by one third, or six nanoseconds. Similarly, new clock three will be removed from new clock one by twelve nanoseconds and from new clock two by six nanoseconds. The only limitation in spacing the new clocks one from the other is the logic delay in the family of semiconductor elements used to make the logic elements. In the present state of the art, the logic delay of the semiconductor elements is appreciably less than six nanoseconds and the series of new clock could be increased to the point where additional new clock elements could be employed. For purposes of simplifying the illustration of this invention we have illustrated three new clocks.

Figure 5:
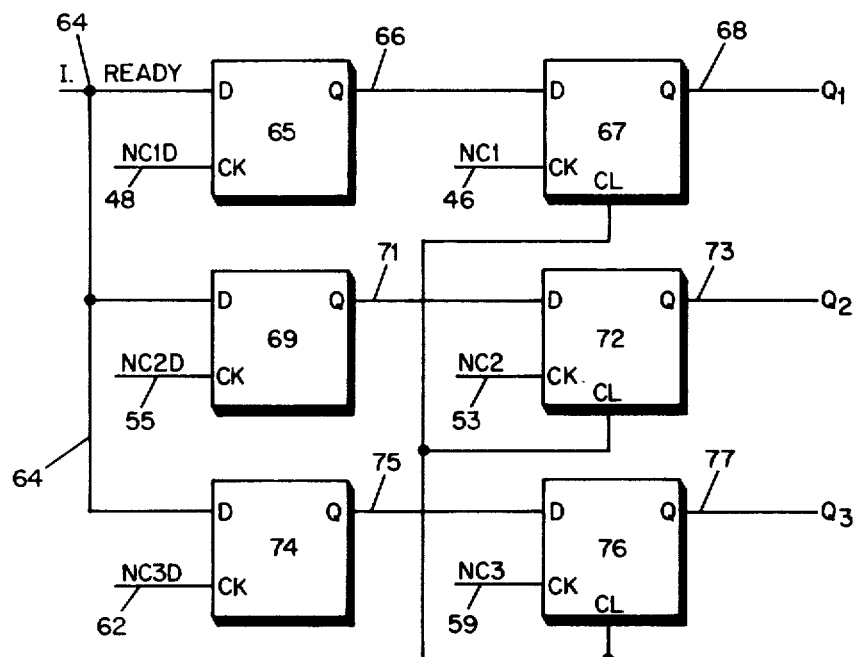
FIG. 5 is a schematic block diagram employing a plurality of dual rank flip-flops for demetastabilizing an asynchronous incoming ready signal with a plurality of new clock signals.

Refer now to FIGS. 3 and 5 showing the high speed processor 40 generating a request signal on line 63 to the main storage unit 42. After the request for information is assimilated in the main storage unit 42 and the main storage unit is prepared to transfer the information addressed, it generates a ready signal or information is on the bus signal on line 64 which is applied to the high speed processor. The high speed processor 40 has internal registers and logic circuitry which will accept this information and store it in buffer registers or assimilate it in active registers. The information ready or the signal which identifies that the data is on the bus is on line 64 as shown in FIG. 5. This information ready signal is applied to flip-flop 65 and if the data is stable when the new clock one delayed signal on line 48 clocks the data it will cause an output on line 66 which is applied to the data input of flip-flop 67. If line 66 is high presenting a data input to flip-flop 67, then the new clock one signal on line 46 will clock the signal through flip-flop 67 and generate an output on line 68. The delay between new clock one delayed and new clock one is sufficient to ensure that the data condition on line 66 will be stable at flip-flop 67 when the new clock one pulse arrives on line 46. As explained hereinbefore, it is possible that the NC1D pulse on line 48 will not coincide with the instruction ready signal on line 64; however, the same signal on line 64 is applied to flip-flop 69 and when the new clock two delayed signal on line 55 arrives and finds the data signal set on flip-flop 69 it will generate an output on line 71, which can be applied to the data input of flip-flop 72. If the data input of flip-flop 72 is high when the new clock two pulse arrives on line 53, it will generate an output on line 73 at the output of flip-flop 72. The same instruction ready signal is applied to flip-flop 74 and the new clock three delayed signal on line 62 attempts to generate an output from flip-flop 74 on line 75. The output on line 75 is applied to the data input of flip-flop 76 and the new clock three pulse on line 59 attempts to clock this data input to the output on line 77 of flip-flop 76. It will now be understood that the instruction ready signal is applied to all three flip-flop 65, 69 and 74 attempting to get a data output on the respective lines 66, 71 or 75. As will be explained hereinafter, once a new clock signal is generated which coincides with the instruction ready signal and generates an output on one of the output lines 66, 71 or 75, a stop scan signal will be generated so that additional outputs will not be produced on the output line 68, 73 and 77. For the purpose of avoiding duplicate output signals, a clear or stop scan signal is generated on line 78, which is applied to the flip-flops 67, 72 and 76. The generation of this signal will be explained with regards to the explanation of FIG. 6.

Figure 6:
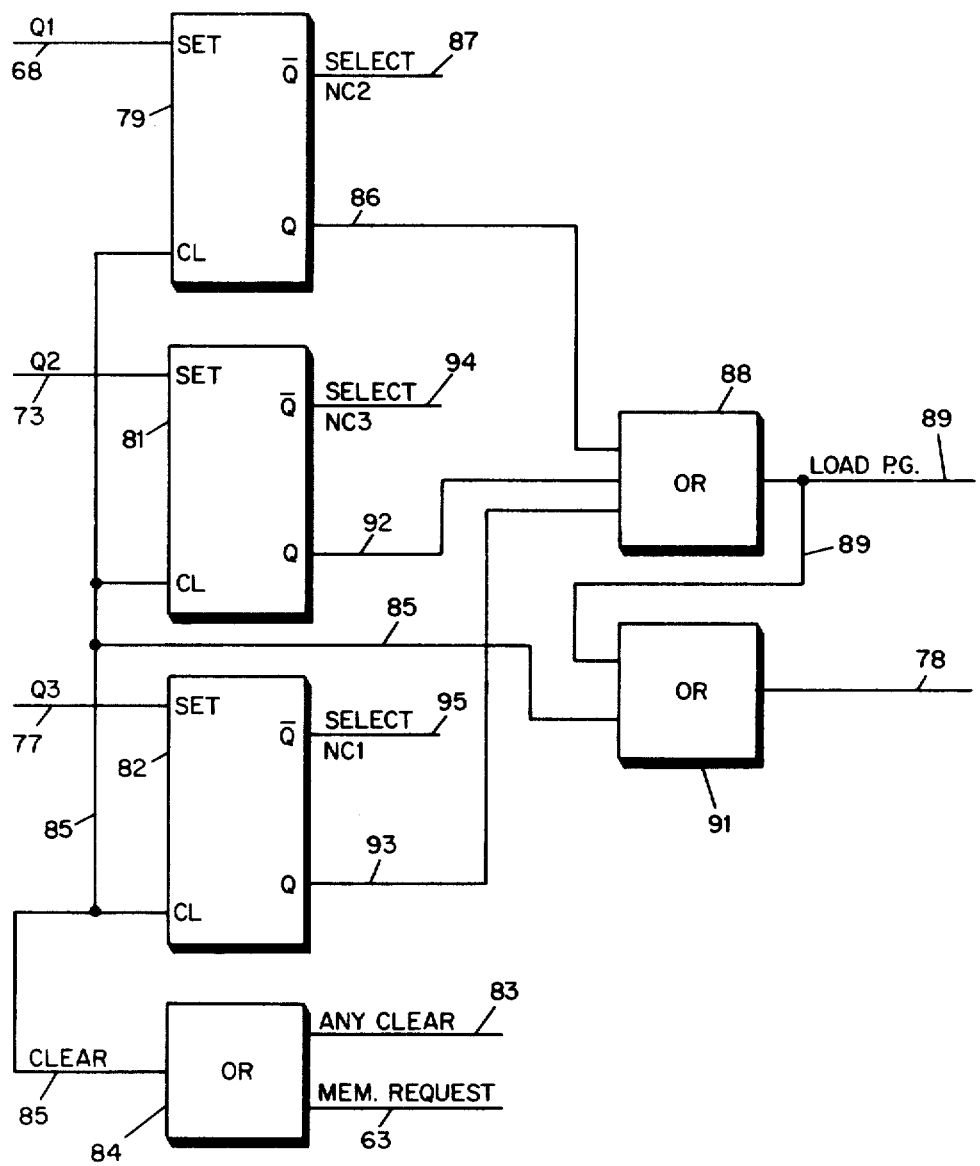
FIG. 6 is a schematic block diagram showing the logic circuitry for generating a plurality of selecting and holding signals employed to restart the phase generator.

Refer now to FIG. 6 and to the outputs from FIG. 5. The Q1, Q2 and Q3 outputs from flip-flop 67, 72 and 76 are signals which identify which one of the clock signals NC1, NC2 or NC3 was the first to respond to the instruction ready signal. These response signals, Q1, Q2 and Q3, are applied to the set side input of RS flip-flops 79, 81, 82, respectively. These flip-flops have already been cleared or reset when any clear signal on line 83 has been generated by the high speed processor 40 or a memory request on line 63 is applied to OR gate 84 to produce a clear signal output on line 85 which is applied to flip-flops 79, 81 and 82. It will be understood that the memory request was a previously generated and sent to MSU 42 in order to get an instruction or data out of memory 42 and memory 42 has responded to with an instruction ready on line 64 or a signal identifying that the data is on the bus. The clear signal on line 85 serves to clear flip-flops 79, 81 and 82 until a response signal is produced on line 68, 73 or 77 which will, in turn, produce a select signal at one of the outputs of the flip-flops. Assume that the select signal Q1 on line 68 is the first to respond to the instruction ready signal on line 64 so that a Q1 signal will set flip-flop 79. When the flip-flop 79 is set, the Q output on line 86 goes high and the $\overline{Q}$ output on line 87 goes low which will select NC2 as will be explained hereinafter. The high output on line 86 from flip-flop 79 is applied to OR gate 88 to produce a high signal output on line 89 which will be employed to load the phase generator 43 shown in FIGS. 3 and 7. Once the load bit on line 89 is applied to the phase generator, it is in a condition which will generate phase outputs once an oscillator input is applied to phase generator 43. Having assumed the Q1 select signal was produced on line 68, it will be understood that no select signal is produced on lines 73 and 77 at flip-flops 81 and 82, accordingly, no high output occurs at lines 92 and 93 of flip-flops 81 and 82 and a high signal is present at the $\overline{Q}$ outputs of flip-flops 81 and 82 on lines 94 and 95. The low and unchanged condition on lines 92 and 93 is applied to OR gate 88 which has passed the high signal on line 86 from the Q output of flip-flop 79. The high output on line 89 is applied to the phase generator and to OR gate 91 to produce an output on line 78 which is applied to clear the second stages of the flip-flops of FIG. 5. Thus, it will be understood that the clear signal on line 78, applied to flip-flop 67, 72 and 76, will prevent an additional signal from being produced at the Q2 or Q3 outputs on line 73 or 77. As will be explained, once a new clock is selected, it is impossible to make a redundant selection or a different selection until a new clear signal is produced on line 85 as a result of any clear or a new memory request.

Figure 7:
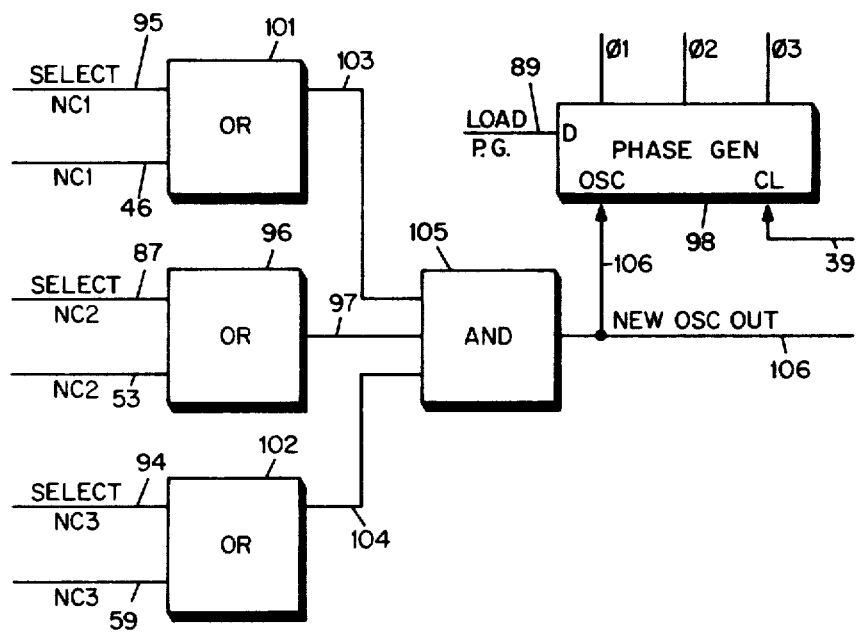
FIG. 7 is a schematic block diagram showing the logic circuits for selecting one of the new clock signals.

Refer now to FIGS. 6 and 7 showing the means for selecting one of the new clock signals synchronized with the ready signal. As previously explained, flip-flop 79 has been set and the Q output on line 86 was driven high when the $\overline{Q}$ output on line 87 was driven low to generate the select NC2 signal. The select NC2 signal on line 87 is low and is applied to OR gate 96, thus permitting only the new clock two (NC2) signal on line 53 to appear at the output of OR gate 96 on line 97. New clock one and new clock three are applying signals on lines 46 and 59, respectively, to OR gates 101 and 102; however, the select signals on lines 95 and 94 are high masking the clocks on lines 46 and 59. The masked signals or high signals on lines 103 and 104 are presented as enable signals to AND gate 105, thus permitting the new clock two (NC2) signal being presented on line 97 to be passed through AND gate 105 to present the actual new clock two (NC2) signal on line 106. The new oscillator output on line 106 is applied to the oscillator input of phase generator 98 which has been previously cleared by clear line 39 and has been presented with a load signal on line 89, thus when the oscillator signal or new clock two signal appears at the oscillator input on line 106, the bit loaded at the data input of phase generator 98 is shifted through the phase generator to present outputs on the phase one, phase two and phase three output lines. It will be understood that the newly selected oscillator will continue to function throughout the central processing unit and high speed processor 40 until another new clock or different clock is selected.

Figure 8:
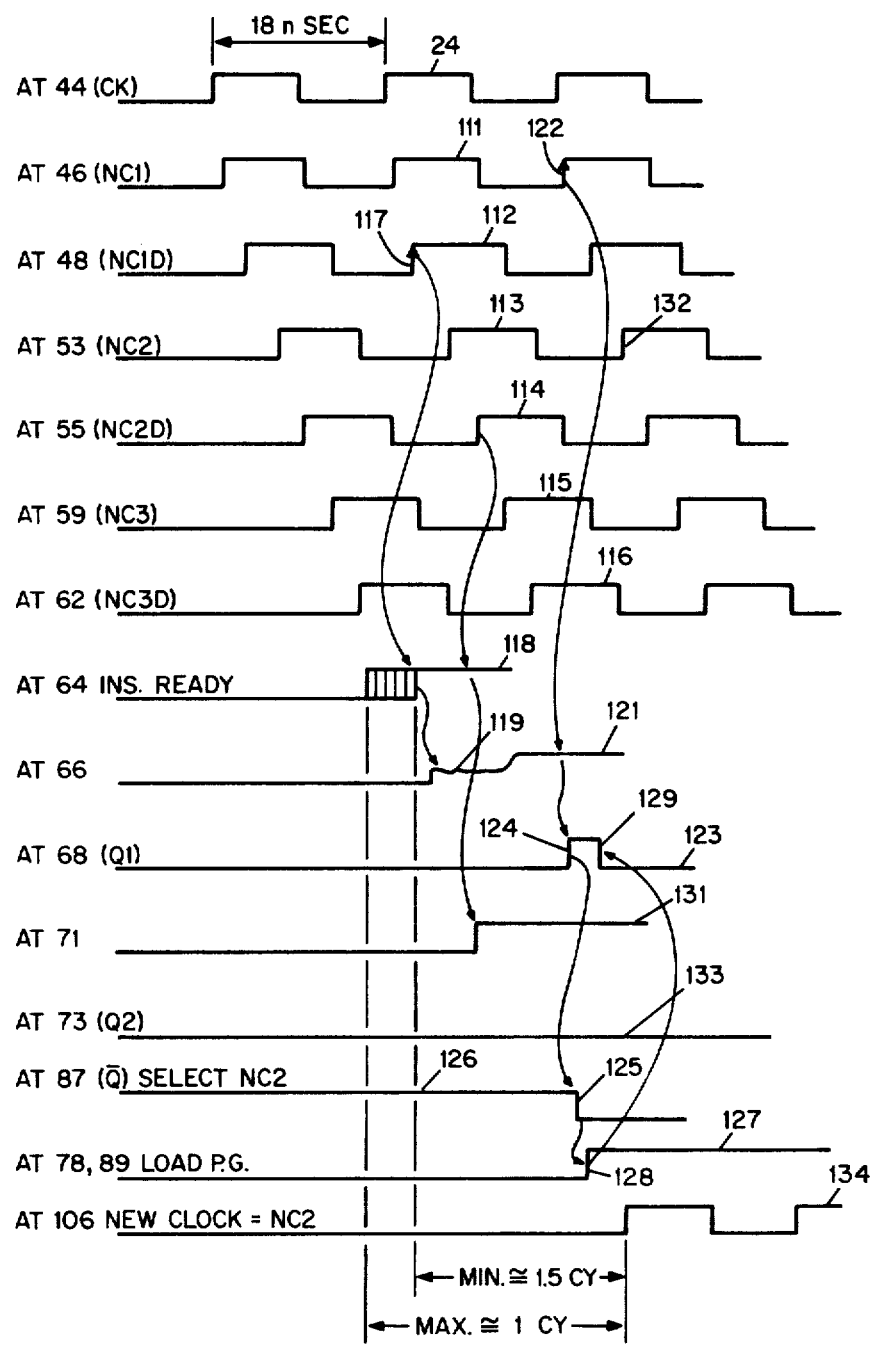
FIG. 8 is a pulse waveform diagram showing the timing and operation of the logic circuits illustrated and FIGS. 3 to 7.

Refer now to FIG. 8 showing the waveforms which are employed throughout the FIGS. 3 to 7. The waveform 24 is the clock output which appears on line 44 and has been previously identified as waveform 24. This clock output is employed in FIG. 4 to produce the waveforms 111 to 116 previously identified as NC1 to NC3 and NC1D to NC3D. Assume that the cycle time of clock waveform 24 is eighteen nanoseconds between leading edges. Since we are employing three new clocks, each new clock will start its leading edge approximately one third or six nanoseconds apart. Since the first new clock one on line 46, shown as waveform 111, has passed through OR gate 45, it is shown having a slight off-set or delay otherwise it would occur with the first leading edge of waveform 24. If we had employed more than three new clocks, the time division of the eighteen nanoseconds would be divided equally among the new clocks. The reason for having a NC1D or new clock one delayed is to allow the signals to stabilize in the dual rank flip-flop circuits shown in FIG. 5. The clock signals on lines 48, 55 and 62 were previously explained as attempting to coincide with the instruction ready signal on line 64. In the previous explanation, the leading edge of waveform 112 at point 117 was the first signal to be able to respond to the instruction ready, waveform 118 on line 64. The coincident signal generates an output on line 66 which causes flip-flop 65 to go high to present a transition or low to high at point 119 of waveform 121. The next following high going signal on line 46 shown as point 122 of waveform 111 coincides with the high signal of waveform 121 on line 66 which causes flip-flop 67 to go high generating the pulse waveform 123 on line 68. The leading edge 124 of waveform 123 is appearing on line 68 as the set input to flip-flop 79 which causes the Q output to go high and present a high going signal on line 86. The $\overline{Q}$ signal on line 87 is shown as a transition from high to low at point 125 of waveform 126. It will be understood that the Q output of flip-flop 79 is the inversion of waveform 126 and the transition point 125 also occurs at the Q output on line 86 which generates a low to high output on line 89 as shown at waveform 127. The transition point 128 of waveform 127 appears on line 78 of FIG. 5 and is applied to the clear input of flip-flops 67, 72 and 76 to prevent another signal from coming through and terminates the Q1 selection pulse at point 129 of waveform 123.

Waveform 131 is appearing on line 71 as a second attempt to coincide with the instruction ready signal on line 64. There is a high signal at the line 71 appearing at the data input of flip-flop 72; however, when the leading edge 132 of waveform NC2 on line 53 appears at flip-flop 72, the flip-flop 72 has already been cleared by line 78 and is held clear until some further time when a new clock selection occurs. The output on line 73 from flip-flop 72 never has the chance to go high and waveform 133 remains low because the clear signal on line 78 clears flip-flop 72 and keeps it in a clear condition until a new selection process takes place.

When waveform 127 went from its low to its high, the transition point 128 also loaded the phase generator 98. The waveform 134 occurs after the phase generator 98 is loaded. The new clock on line 106 being applied to the oscillator input of the phase generator 98 is the same as the signal output of NC2 on line 53.

From the time the instruction ready signal first appears on line 64 until the new clock NC2 is being applied to phase generator 98, is approximately one and one half cycles maximum. The duration of the instruction ready signal no longer has to be a whole cycle time, but only occurs for slightly more than one third of a cycle time, thus the minimum time between the attempt of the instruction ready signal and the start of phase generator 98 is approximately one cycle time.

Having explained how the master clock may be employed to generate a plurality of new clocks and a plurality of delayed new clocks, it is now apparent that the new clocks may be spaced apart from each other closer than one third of one cycle time, thus the maximum cycle time can be made to approach the minimum cycle time of approximately one cycle. In high speed processing systems, the reduction of cycle time for introducing new instructions and new data from the main storage unit is a very desirable condition which increases the throughput of the computer without changing appreciably the hardware.

Having explained a preferred embodiment of the invention, it will now be understood that the logic circuits, including a plurality of new clocks and a plurality of delayed new clocks, are, in effect, synchronizing the clocks with the incoming instruction ready or asynchronous signal and not attempting to synchronize the asynchronous signal with the fixed clock as was done in the prior art. In the preferred embodiment explained herein, it has been shown that enhancements of up to forty percent may be achieved with very little cost. Not only is there an enhancement of time, but since the clear signal is recirculated back to cut off the other clocks there is the possibility of enhancement in reliability in case of a metastable condition where a flip-flop would be in a metastable condition and be capable of changing its output.

I claim:

1. In a high speed central processing unit, apparatus for synchronizing new clock signals with an asynchronous external ready signal, comprising:

a high speed central processing unit having a continuous running master clock for generating master clock signal, a memory unit having instructions stored therein, means in said central processing unit for requesting an instruction in memory, means in said memory for generating the set ready signal in response to a request for instruction, a phase generator connected to said central processing unit for generating phase signals, means in said central processing unit for generating a signal for stopping said phase generator after a request for an instruction is issued, means connected to said master clock for generating a plurality of the new clock signals which are phase related to said master clock signal, means responsive to said ready signal for sampling said new clock signals to determine which new clock signal will be synchronized with said asynchronous ready signal from said memory, means for selecting one of said new clock signals synchronized with said ready signal, and means for restarting said phase generator with said selected new clock signal.

2. In a high speed central processing unit of the type set forth in claim 1, wherein said means for generating a plurality of new clock signals includes a plurality of outputs associated with each new clock signal.

3. In a high speed central processing unit of type set forth in said claim 2, wherein said plurality of outputs associated with each new clock signal includes a new clock signal and a delayed new clock signal.

4. In a high speed central processing unit of the type set forth in claim 3, wherein said means for sampling said new clock signals comprise logic means coupled to said new clock signals and said delayed new clock signals for generating a signal indicating which delayed new clock signal is the first to respond to said ready signal from said memory.

5. In a high speed central processing unit of the type set forth in claim 4, wherein said means for selecting one of said new clock signals comprises a plurality of bistable devices coupled to the output of the signals indicating which delayed new clock signal is the first to respond to said ready signal for generating a select signal indicating one of said plurality of new clocks.

6. In a high speed central processing unit of the type set forth in claim 5, wherein said means for selecting one of said new clocks comprises logic gating means coupled to said select signal and to said new clock signals for generating a new clock output, whereby said new clock output is employed to drive said central processing unit and said phase generator.

* * * * *